US009114495B2

(12) United States Patent
Sakai et al.

(10) Patent No.: US 9,114,495 B2
(45) Date of Patent: Aug. 25, 2015

(54) MACHINING METHOD AND MACHINING APPARATUS OF VALVE HOLES OF CYLINDER HEAD, AND CLAMP DEVICE

(75) Inventors: Daiki Sakai, Tochigi (JP); Kenichi Imabuchi, Tochigi (JP); Tetsuo Ishii, Tochigi (JP); Katsumune Inaki, Tochigi (JP); Shugo Arakawa, Tochigi (JP); Kazuhide Ito, Tochigi (JP); Hiroshi Kashiwagi, Tochigi (JP); Masayuki Kaneko, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 126 days.

(21) Appl. No.: 13/599,821

(22) Filed: Aug. 30, 2012

(65) Prior Publication Data
US 2012/0324729 A1 Dec. 27, 2012

Related U.S. Application Data

(63) Continuation of application No. PCT/JP2011/056863, filed on Mar. 22, 2011.

(30) Foreign Application Priority Data

Mar. 25, 2010 (JP) .................. 2010-070607
Mar. 25, 2010 (JP) .................. 2010-070608

(51) Int. Cl.
*B23Q 39/02* (2006.01)
*B23B 41/12* (2006.01)
*B23C 3/05* (2006.01)
*B23Q 39/00* (2006.01)

(52) U.S. Cl.
CPC .............. *B23Q 39/028* (2013.01); *B23B 41/12* (2013.01); *B23C 3/05* (2013.01);

(Continued)

(58) Field of Classification Search
USPC .............. 29/33 P, 563; 123/193.5; 198/345.3, 198/346.1; 408/1 R, 89, 91; 409/131, 158, 409/174; 13/33 P, 563
See application file for complete search history.

(56) References Cited

U.S. PATENT DOCUMENTS 3,782,847 A * 1/1974 Kulzer .......................... 408/1 R
4,603,456 A * 8/1986 Hiroyasu et al. ............... 29/33 P
(Continued)

FOREIGN PATENT DOCUMENTS

JP 55-138030 U 10/1980
JP 57-127632 8/1982
(Continued)

OTHER PUBLICATIONS

Japanese Office Action with English translation dated Sep. 24, 2014, 6 pages.

*Primary Examiner* — Alexander P Taousakis
(74) *Attorney, Agent, or Firm* — Rankin, Hill & Clark LLP

(57) ABSTRACT

Two cylinder heads (3, 3) are disposed side by side. Upper side intake valve holes (34*a*, 34*c*, 34*e*, 34*g*) of one of the cylinder heads (3) and upper side exhaust valve holes (35*a*, 35*c*, 35*e*, 35*g*) of the other of the cylinder heads (3) are simultaneously machined by a multi-spindle head (24) integrally including intake side tools (26*a* to 26*d*) and exhaust side tools (28*a* to 28*d*). After moving the one of the cylinder heads (3) upward by a pitch P1 of the intake valves and moving the other of the cylinder heads (3) upward by a pitch P2 of the exhaust valves, remaining intake valve holes (34*b*, 34*d*, 34*f*, 34*h*) of the one of the cylinder heads (3) and remaining exhaust valve holes (35*b*, 35*d*, 35*f*, 35*h*) of the other of the cylinder heads (3) are simultaneously machined.

1 Claim, 8 Drawing Sheets

(52) U.S. Cl.
CPC ...... *B23Q 2039/006* (2013.01); *Y10T 29/4927* (2015.01); *Y10T 29/51* (2015.01); *Y10T 408/03* (2015.01); *Y10T 408/385* (2015.01); *Y10T 408/5614* (2011.01)

(56) References Cited

U.S. PATENT DOCUMENTS

| | | | | |
|---|---|---|---|---|
| 4,614,609 | A | * | 9/1986 | Inoue et al. ............... 252/299.66 |
| 5,829,928 | A | * | 11/1998 | Harmand et al. ............ 408/83.5 |
| 7,150,706 | B2 | * | 12/2006 | Grob ............................... 483/54 |

FOREIGN PATENT DOCUMENTS

| | | | |
|---|---|---|---|
| JP | 57-211459 | A | 12/1982 |
| JP | 59-005213 | | 1/1984 |
| JP | 61-148511 | | 9/1986 |
| JP | 62-148109 | A | 7/1987 |
| JP | 62-173153 | A | 7/1987 |
| JP | 3-294133 | A | 12/1991 |
| JP | 10-128608 | | 5/1998 |
| JP | 2001-099967 | A | 4/2001 |
| JP | 2005-169516 | A | 6/2005 |
| JP | 2005-264818 | A | 9/2005 |

* cited by examiner

MACHINING METHOD AND MACHINING APPARATUS OF VALVE HOLES OF CYLINDER HEAD, AND CLAMP DEVICE

CROSS-REFERENCE TO RELATED APPLICATION

This application is a Continuation Application of International Application No. PCT/JP2011/056863 filed on Mar. 22, 2011, which claims priority to Japanese Patent Application No. 2010-070607, filed Mar. 25, 2010 and Japanese Patent Application No. 2010-070608, filed Mar. 25, 2010, the disclosure of the prior applications are hereby incorporated in their entirety by reference.

TECHNICAL FIELD

The present invention relates to a method and apparatus for machining valve holes of a cylinder head of an internal combustion engine.

The present invention also relates to a clamp device that holds a workpiece while the workpiece is being machined.

BACKGROUND ART

In general, in a workpiece such as a cylinder head that constitutes an engine, a plurality of valve holes to which intake valves and exhaust valves are attached are provided for a single cylinder (see, for example, Patent Document 1). When machining the plurality of valve holes in the cylinder head, it is preferable that the valve holes are machined by a small number of processes and with high precision.

In order to simultaneously machine a plurality of valve holes, it is considered to use a so-called gang head (multi-spindle head), in which, for example, a plurality of tools for performing reamer machining is rotatably provided. However, it is difficult to machine a plurality of intake valve holes and a plurality of exhaust valve holes which are formed on one cylinder with single processing, since the valve holes are proximately adjacent to each other. In order to solve this, a plurality of multi-spindle heads for intake valve holes and a plurality of multi-spindle heads for exhaust valve holes are provided, and valve holes that are to be machined are machined using one of the multi-spindle heads that is suitable to the position of the valve holes that are to be machined. Therefore, there are problems in that the number of the multi-spindle heads increases, the operation becomes complicated, and the steps of the machining process increase.

In addition, a clamp device that clamps the cylinder head with respect to the machine tool is used when machining the valve holes in the cylinder head as described above.

It is preferable that a clamp device shifts (moves) a workpiece with respect to the machine tool in the state in which the workpiece is clamped. However, when an actuator for changing the amount of shift is provided, there is a problem in that the configuration of the apparatus becomes complicated.

PRIOR ART DOCUMENT

Patent Document

Patent Document 1: JP-A-2005-264818

SUMMARY OF INVENTION

Embodiments of the invention provide a method and apparatus for machining valve holes of a cylinder head, in which a plurality of valve holes can be machined by a small number of process steps.

In addition, embodiments of the invention provide a clamp device that can change a shift amount of a workpiece with a simple configuration.

In accordance with embodiments of the invention, a plurality of valve holes 34, 35 of a cylinder head 3 of an internal combustion engine may be machined, using a first tool 26 and a second tool 28, by a step of machining one 34 of a pair of first valve holes 34 by the first tool 26, moving the cylinder head 3 with respect to the first tool 26, and then machining the other 34 of the pair of the first valve holes 34 by the first tool 26; and a step of machining one 35 of a pair of second valve holes 35 by the second tool 28, moving the cylinder head 3 with respect to the second tool 28, and then machining the other 35 of the pair of the second valve holes 35 by the second tool 28.

In accordance with embodiments of the invention, a valve hole machining apparatus 1 in which a plurality of intake valve holes and a plurality of exhaust valve holes are machined in a cylinder heads of internal combustion engines may include: two body sections 15A, 15B to which two cylinder heads 3, 3 are respectively fixed; a multi-spindle tool 22 disposed to face the body sections 15A, 15B and including a first tool 26 which machines intake valve holes 34 of one of the cylinder heads 3 and a second tool 28 which machines exhaust valve holes 35 of the other of the cylinder heads 3; and a moving device 59A, 59B which separately moves the respective cylinder heads 3 with respective to the multi-spindle tool 22.

In accordance with embodiments of the invention, a clamp device 9 may include: a body section 52A, 52B rotatable around a rotary shafts 41A1, 41B1; a rotary unit 41A, 41B which adjusts a position at which the body section 52A, 52B rotates; a stopper section 61A, 61B fixed to one end of the body section 52A, 52B in an axial direction; an urging device 59A, 59B which urges the body section 52A, 52B to one side of an axial direction; and an index plate 63A, 63B with which the stopper section 61A, 61B comes into contact when the body section 52A, 52B is pressed to one side in the axial direction. The index plate 63A, 63B may include a plurality of plate sections 70a to 70j having different thicknesses. The plurality of the plate sections 70a to 70j may be disposed on a same circumference.

Other aspects and advantages of the invention will be apparent from the following description, the drawings and the claims.

DESCRIPTION OF EMBODIMENTS

Figure 1:
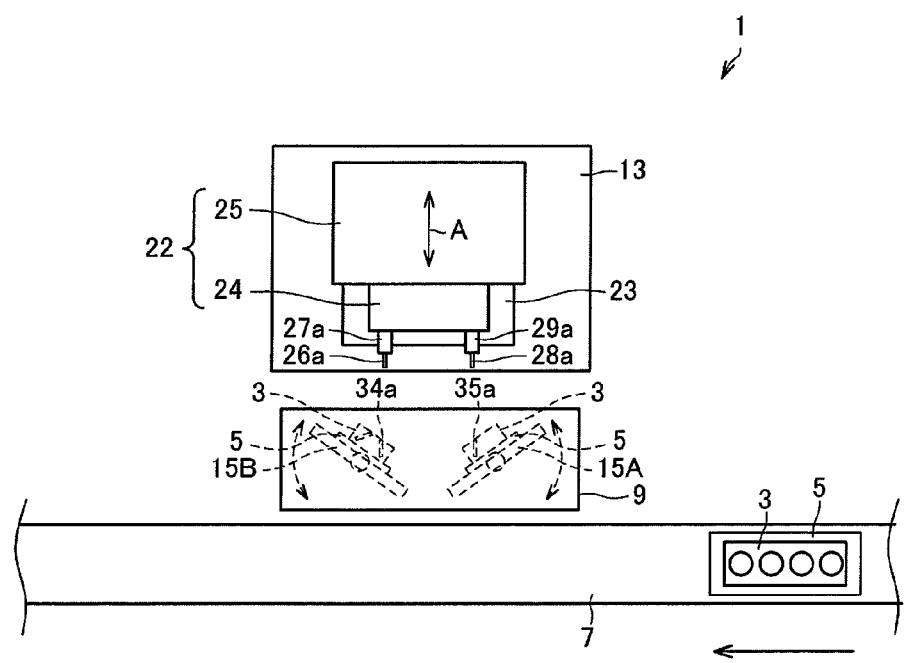
FIG. 1 is a schematic configuration view of an apparatus for machining valve holes according to an exemplary embodiment of the invention.

FIG. 1 is a schematic configuration view of an apparatus for machining valve holes according to an exemplary embodiment of the invention. In FIG. 1, reference numeral 1 indicates an apparatus for machining valve holes. The apparatus for machining valve holes 1 includes a conveyor 7, which conveys a pallet 5 on which a cylinder head (workpiece) 3 is loaded, a clamp device 9, which fixes the cylinder head 3 conveyed on the conveyor 7 together with the pallet 5, and a machine tool 13, which is disposed opposite the clamp device 9, and has a plurality of tools for machining valve holes in the cylinder head 3.

The clamp device 9 is disposed between the conveyor 7 and the machine tool 13, and includes a pair of left and right jig bodies (bodies) 15A and 15B to which the cylinder head 3 is fixed in the state in which the cylinder head 3 is loaded on the pallet 5. The respective jig bodies 15A and 15B are configured such as to be rotatable around a rotary shaft that extends in the perpendicular direction. In this configuration, after the cylinder head 3 is attached from the conveyor 7 to the jig bodies 15A and 15B by orienting the jig bodies 15A and 15B toward the conveyor 7, the cylinder head 3 can be oriented toward the machine tool 13. In addition, attaching and detaching the cylinder head 3 and the pallet 5 between the conveyor 7 and the jig bodies 15A and 15B is executed by a loader (a supply device) which is not shown.

Figure 2A:
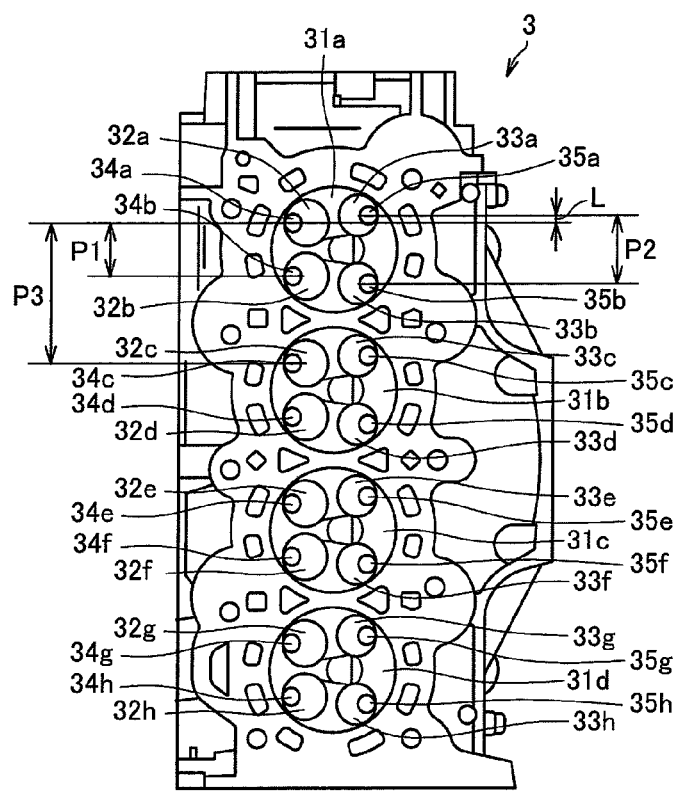
FIG. 2A is a top plan view showing the interior of the cylinder head.
Figure 2B:
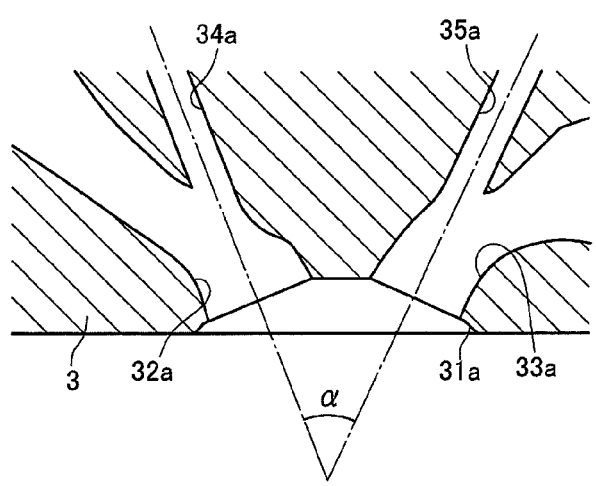
FIG. 2B is a cross-sectional view of the cylinder head.

FIG. 2A is a top plan view showing the interior of the cylinder head, and FIG. 2B is a cross-sectional view showing intake ports, exhaust ports and respective valve holes formed in the cylinder head.

In an exemplary embodiment, as shown in FIG. 2A, the cylinder head 3 constitutes an inline 4 cylinder and 16 valve engine, and intake ports 32a to 32h and exhaust ports 33a to 33h are provided such as to correspond to respective combustion chambers (cylinders) 31a to 31d.

The respective intake ports 32a to 32h are provided with intake valve holes 34 (34a to 34h) to which intake valves (not shown) which operate to open and close the intake ports 32a to 32h are to be attached, and the respective exhaust ports 33a to 33h are provided with exhaust valve holes 35 (35a to 35h) to which exhaust valves (not shown) which operate to open and close the exhaust ports 33a to 33h are to be attached.

The pitch P1 between two intake valve holes 34a and 34b provided in one combustion chamber 31a is formed the same as the pitch between the intake valve holes provided in the other combustion chambers 31b to 31d. In addition, the pitch P2 between two exhaust valve holes 35a and 35b provided in one combustion chamber 31a is formed the same as the pitch between the exhaust valve holes provided in the other combustion chambers 31b to 31d.

In addition, in one combustion chamber 31a, the intake valve hole 34a and the exhaust valve hole 35a are formed at positions that are offset by a predetermined offset length L in the height direction. This relationship is the same for the other combustion chambers 31b to 31d.

In addition, in the combustion chambers 31a to 31d, the intake valve holes and the exhaust valve holes, which are formed at the corresponding positions in the respective combustion chambers 31a to 31d, are provided with the same pitch P3.

In addition, in one combustion chamber 31a, as shown in FIG. 2B, the intake valve hole 34a and the exhaust valve hole 35a are provided such that a predetermined included angle α is defined therebetween. Thus, when machining the valve holes in the cylinder head 3, as shown in FIG. 1, the respective jig bodies 15A and 15B to which the cylinder head 3 is fixed are rotated to a predetermined angle and held in that position, and the tools of the machine tool 13 are moved toward the jig bodies 15A and 15B, so that the tools of the machine tool 13 machine the respective valve holes.

A description will be given below of the machine tool.

Figure 3:
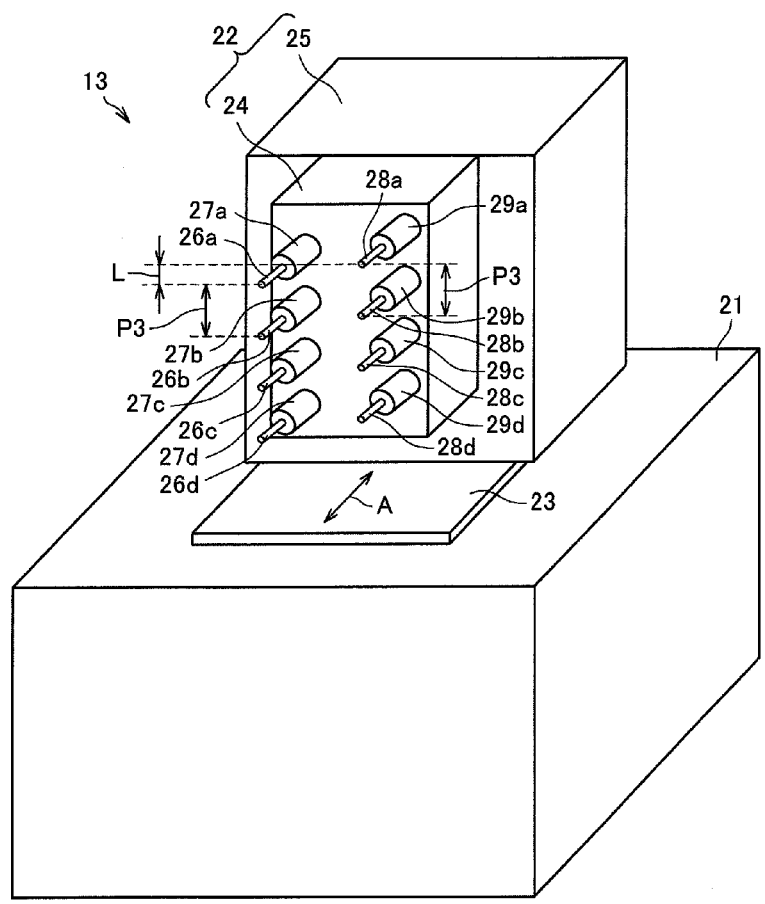
FIG. 3 is a schematic view of the machine tool.

FIG. 3 is a schematic view showing the outer shape of the machine tool 13. The machine tool 13 includes a base 21 and a multi-spindle tool 22, which is disposed on the base 21 such as to be able to reciprocate in the horizontal direction (direction indicated by arrow A). The multi-spindle tool 22 includes a multi-spindle head 24 to which a plurality of tools is attached and a drive unit 25, which drives the multi-spindle head 24. The multi-spindle tool 22 is disposed on a rail 23, which is provided on the upper portion of the base 21. A conveying means (not shown), for example, a ball screw means is provided between the multi-spindle tool 22 and the base 21. In response to a conveyor motor (not shown) driving the ball screw means, the multi-spindle tool 22 engaged with the ball screw means moves back and forth while sliding on the guide rail 23.

Intake-side tool holders 27a to 27d to which intake-side tools 26 (26a to 26d), which machine the intake valve holes 34 (34a to 34h), are attached and exhaust-side tool holders 29a to 29d to which exhaust-side tools 28 (28a to 28d), which machine the exhaust valve holes 35 (35a to 35h), are attached are integrally provided on the front surface of the multi-spindle head 24.

The intake-side tool holders 27a to 27d and the exhaust-side tool holders 29a to 29d are disposed in the vertical direction, respectively. The pitch P3 between the respective intake-side tool holders 27a to 27d and between the respective exhaust-side tool holders 29a to 29d is formed the same as the pitch P3 between the intake-valve holes and between the exhaust valve holes, which are formed at the corresponding positions in the respective cylinders 31a to 31d. In addition, the center of the axis of the intake-side tool 26a attached to the intake-side tool holder 27a and the center of the axis of the exhaust side tool 28a attached to the exhaust-side tool holder 29a are offset by the above-described offset length L in the vertical direction.

In an exemplary embodiment, the intake-side tools 26a to 26d and the intake-side tool holders 27a to 27d are provided such as to constitute a multi-spindle tool for forming intake-side valve holes, and the exhaust-side tools 28a to 28d and the exhaust-side tool holders 29a to 29d are provided such as to constitute a multi-spindle tool for forming exhaust-side valve holes.

Next, a description will be given of the clamp device.

Figure 4:
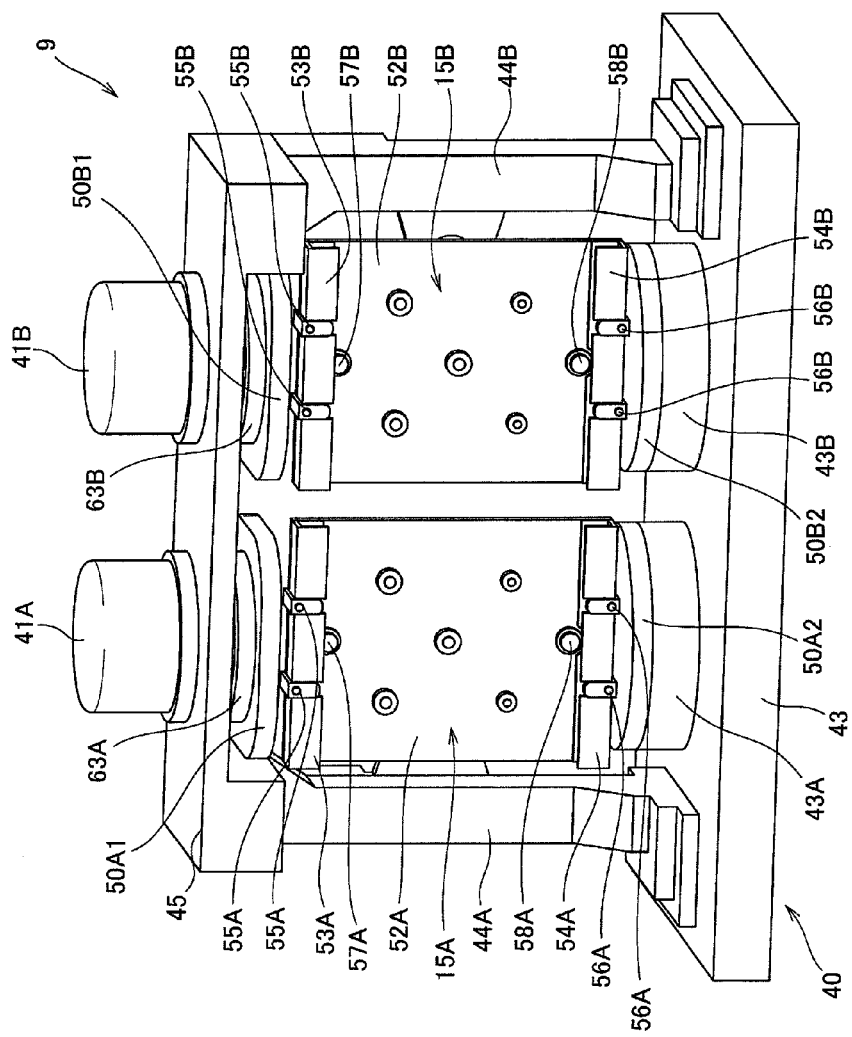
FIG. 4 is a schematic view showing the outer shape of the clamp device.
Figure 5:
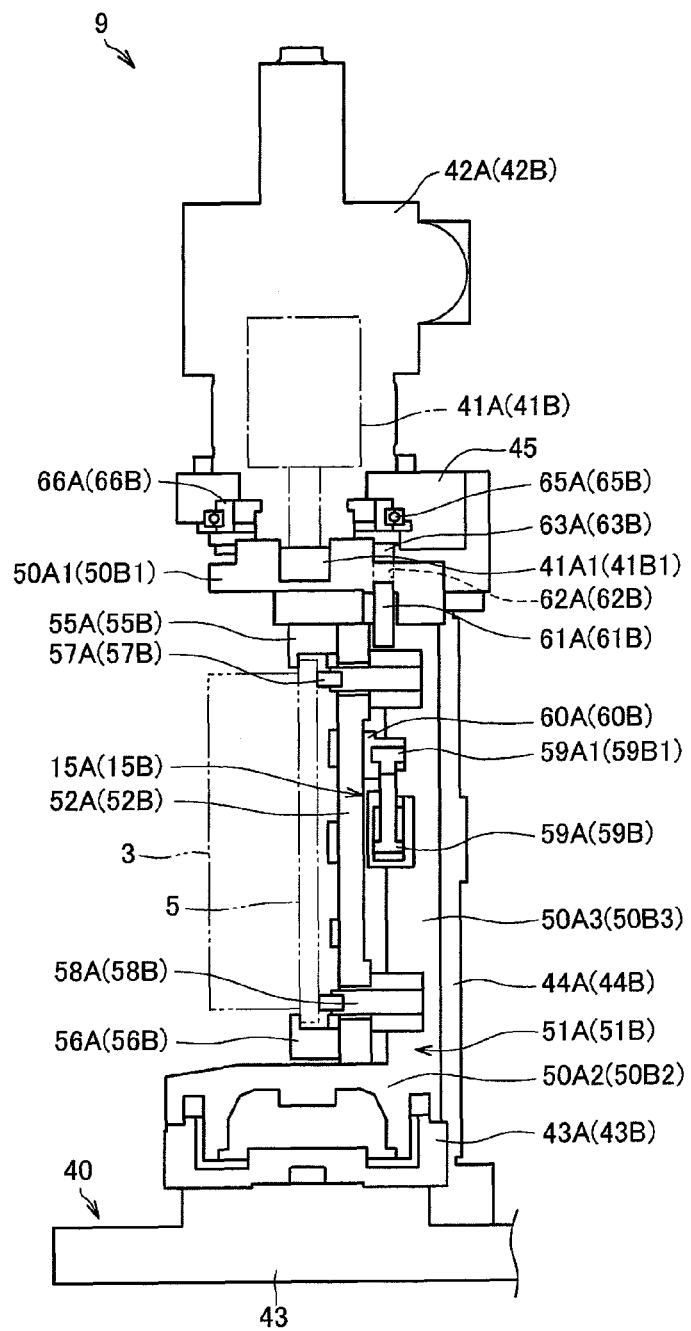
FIG. 5 is a side cross-sectional view of the clamp device.

FIG. 4 is a schematic view showing the outer shape of the clamp device 9, and FIG. 5 is a side cross-sectional view of the clamp device 9. As shown in FIG. 4, the clamp device 9 includes a device body 40, which constitutes a frame, the jig bodies 15A and 15B, which are rotatably provided on the device body 40, and drive motors (rotary units) 41A and 41B, which rotate the jig bodies 15A and 15B as well as adjust the positions at which the jig bodies 15A and 15B rotate. As shown in FIG. 5, the drive motors 41A and 41B are received in housings 42A and 42B, respectively, are fixed to the device body 40, and are provided with an encoder (not shown), which detects the positions at which the jig bodies 15A and 15B rotate. In FIG. 4 above, for the sake of convenience, descriptions of the housings 42A and 42B are omitted and the drive motors 41A and 42B are shown in the exposed state.

As shown in FIG. 4, the device body 40 includes a base 43, a pair of left and right column members 44A and 44B, which extends upward from the base 43, and an upper frame member 45, which connects the upper portions of the column members 44A and 44B to each other. The device body 40 has the shape of a portal. Respective table bases 43A and 43B that are substantially cylindrical are provided on the base 43 such as to be below the drive motors 41A and 41B. The respective jig bodies 15A and 15B connected to the drive motors 41A and 41B are rotatably placed on the table bases 43A and 43B.

Since the jig bodies 15A and 15B have substantially the same configuration, only one jig body 15A will be described, but a description of the other jig body 15B in which the same reference numerals are used will be omitted.

As shown in FIG. 5, the jig body 15A includes a frame section 51A and a shift table (body section) 52A. The frame section 51A is integrally provided with an upper member 50A1, which is connected to a rotary shaft 41A1 of the drive motor 41A, a lower member 50A2, which is rotatably placed on the table base 43A, and a connector member 50A3, which connects the upper member 50A1 and the lower member 50A2 to each other, and has a U-shaped cross-section. The shift table (body section) 52A can be moved up and down with respect to the frame section 51A.

The upper member 50A1 extends below the upper frame member 45 of the device body 40, and is connected to the rotary shaft 41A1 of the drive motor 41A, which extends through the upper frame member 45. In addition, a bearing (not shown) is disposed between the lower member 50A2 and the table base 43A of the device body 40 such as to be rotatable. Therefore, the frame member 51A (jig body 15A) rotates integrally with the device body 40 following the rotation of the drive motor 41A. In addition, since the drive motor 41A is provided with the encoder, the amount of rotation (angle of rotation) at which the jig body 15A rotates from the reference position (position that directly faces the machine tool) is calculated by the encoder.

As shown in FIG. 4, engagement members 53A and 54A are provided on the upper and lower ends of the shift table 52A, respectively. The respective engagement members 53A and 54A engage with the upper and lower ends of the pallet 5, which is disposed on the jig body 15A. The engagement members 53A and 54A have a substantially U-shaped cross-section, such that the upper portions of the engagement members 53A and 54A are open. The pallet 5 is attached between the engagement members 53A and 54A.

In addition, a pair of pallet clamp cylinders 55A and 55A is provided on the upper end of the shift table 52A such as to expand and contract in the direction of the thickness of the plate of the shift table 52A. The leading end of the pallet clamp cylinder 55A is configured such as to extend downward and penetrate into the engagement member 53A through a notch formed in the engagement member 53A. In addition, a pair of pallet clamp cylinders 56A and 65A is provided on the lower end of the shift table 52A such as to expand and contract in the direction of the thickness of the plate of the shift table 52A. The leading end of the pallet clamp cylinder 56A is configured such as to extend upward and penetrate into the engagement member 54A through a notch formed in the engagement member 54A.

Positioning cylinders 57A and 58A are provided on the rear surface of the shift table 52A such as to extend through the shift table 52A and expand and contract in the direction of the thickness of the plate of the shift table 52A. The pallet positioning cylinder 57A is provided below the engagement member 53A and substantially in the center of the above-described pallet clamp cylinders 55A and 55A. In addition, the pallet positioning cylinder 58A is provided above the engagement member 54A and substantially in the center of the above-described pallet clamp cylinders 56A and 56A. According to this configuration, as shown in FIG. 5, the upper end of the pallet 5 that is disposed between the engagement members 53A and 54A is clamped by the pallet clamp cylinders 55A and 55A and the pallet positioning cylinder 57A, and the lower end of the pallet 5 is clamped by the pallet clamp cylinders 56A and 56A and the pallet positioning cylinder 58A. Therefore, the pallet cylinders 55A and 56A and the pallet positioning cylinders 57A and 58A constitute a clamping section.

The shift table 52A is attached to the frame section 51A such as to move up and down. In this configuration, the shift table 52A to which the cylinder head 3 is fixed can be moved up and down with respect to the machine tool 13. Therefore, it is possible to machine the exhaust valve holes 35a, 35c, 35e and 35g in the respective upper portion of the cylinders and then machine the exhaust valve holes 35b, 35d, 35f and 35h in the respective lower portions of the cylinders using the exhaust-side tools 28a to 28d, which are provided on the multi-spindle head 24 of the machine tool 13.

As shown in FIG. 5, a hydraulic cylinder (an urging device, a moving device) 59A, which expands and contracts in the vertical direction, is fixed to the connector member 50A3 of the frame section 51A, and the leading end 59A1 of the hydraulic cylinder 59A is connected to a joint 60A, which is provided on the rear surface of the shift table 52A. In addition, the frame section 51A is provided with a plurality of guide members (not shown), which guides the shift table 52A when the shift table 52A moves up and down.

In addition, a positioning shaft (stopper section) 61A is provided on the upper end of the rear surface of the shift table 52A such as to extend upward from the upper end. The positioning shaft 61A extends through a through-hole 62A, which is formed in the upper member 50A1 of the frame section 51A, such as to be in contact with an index plate 63A, which is provided on the upper frame member 54 of the device body 40. The distance between the index plate 63A and the upper end of the positioning shaft 61A is adjusted by a predetermined shift amount (e.g. the above-described pitch P2). The shift amount of the shift table 52A can be simply regulated by moving the shift table 52A upward until the positioning shift 61A collides against the index plate 63A. In addition, in a configuration, the index plate 63A has a plurality of plate sections that have different thicknesses, in which the plate sections are disposed on the same circumference such that the shift amount is variable. However, this characteristic will be described later.

A description will be given of the sequence according to which the valve hole machining apparatus 1 having the above-described configuration machines valve holes.

First, as shown in FIG. 1, the cylinder head 3 fixed to the pallet 5 that is conveyed by the conveyor 7 is fixed to the left and right jig bodies 15A and 15B (the shift tables 52A and 52B (FIG. 4)) of the clamp device 9 by the loader.

In sequence, the clamp device 9 rotates the jig bodies 15A and 15B to a predetermined angle by operating the drive motors 41A and 41B. In this case, the respective angles of the intake valve holes 34a to 34h and the exhaust valve holes 35a to 35h, which will be formed in the cylinder head 3, are determined in advance. Therefore, the respective drive motors 41A and 41B are controlled such that the jig body 15A is oriented at the angle at which the exhaust valve holes 35a to 35h are machined and the jig body 15B is oriented at the angle at which the exhaust valve holes 34a to 34h are machined.

In sequence, the machine tool 13 moves the multi-spindle head 24 (multi-spindle tool 22) so as to slide toward the cylinder heads 3 and 3 fixed to the jig bodies 15A and 15B of the clamp device 9 while driving the intake-side tools 26a to 26d and the exhaust-side tools 28a to 28d, which are provided in the multi-spindle head 24, so as to rotate. In response to this, as for the cylinder head 3 fixed to one jig body 15A, the respective exhaust valve holes 35a, 35c, 35e and 35g are formed in the respective upper portions of the cylinders by the respective exhaust-side tools 28a to 28d, and as for the cylinder head 3 fixed to the other jig body 15B, the respective intake valve holes 34a, 34c, 34e and 34g are formed in the respective upper portions of the cylinders by the respective intake-side tools 26a to 26d. After that, the multi-spindle head 24 is moved away from the cylinder heads 3 and 3 fixed to the jig bodies 15A and 15B and then stands by at a predetermined position.

In sequence, the clamp device 9 moves the shift table 52A upward to the predetermined pitch P in one jig body 15A while moving the shift table 52B upward to the predetermined pitch P in the other jig body 15B. In addition, the multi-spindle head 24 (multi-spindle tool 22) is moved again so as to slide toward the cylinder heads 3 and 3. In response to this, as for the cylinder head 3 fixed to one jig body 15A, the respective exhaust valve holes 35b, 35d, 35f and 35h are formed in the respective lower portions of the cylinders by the respective exhaust-side tools 28a to 28d, and as for the cylinder head 3 fixed to the other jig body 15, the respective intake valve holes 34b, 34d, 34f and 34h are formed in the respective lower portions of the cylinders by the respective intake-side tools 26a to 26d.

Therefore, in response to the cutting process perform twice, the exhaust valve holes 35a to 35h are machined in one of the cylinder heads 3, which are provided together, and the intake valve holes 34a to 34h are machined in the other of the cylinder heads 3. It is therefore possible to simply machine the valve holes by reducing the number of the steps of the machining process.

In sequence, the cylinder head 3, which is fixed to one jig body 15A and in which the exhaust valve holes 35a to 35h are machined, is moved toward the other jig body 15B, and then the intake valve holes 34a to 34h are machined in this cylinder head 3.

Specifically, first, the other jig body 15B is rotated toward the conveyor 7, and the cylinder head 3 fixed to the jig body 15B is taken out and is placed on the conveyor 7. Then, the left and right jig bodies 15A and 15B are rotated so as to directly face the machine tool 13, and the cylinder head 3 disposed on one jig body 15A is moved to the other jig body 15B using a moving mechanism (not shown) which is provided on the clamp device 9.

The moving mechanism includes a guide rail, which extends in the width direction of the left and right jig bodies 15A and 15B, a slider, which moves on the guide rail, and a pair of arms, which extends from the slider to the jig bodies. In response to the slider moving on the guide rail in the state in which the arm is holding the cylinder head 3, the pallet 5 to which the cylinder head 3 is attached moves on the engagement members 54A and 54B of the jig bodies 15A and 15B. In this case, the clamping by the pallet clamp cylinder and the pallet positioning cylinder is released.

After the cylinder head 3 in which the exhaust valve holes 35a to 35h are machined is moved to the other jig body 15B, one jig body 15A is rotated toward the conveyor 7, so that a new cylinder head 3 is fixed to this jig body 15A. In addition, the valve hole machining is continuously carried out by repeatedly performing the above-cutting process.

However, in this configuration, the respective shift amounts of the shift tables 52A and 52B are regulated due to the respective positioning shafts 61A and 61B coming into contact with the respective index plates 63A and 63B. Here, since an event in that the shift amounts are separately changed due to changes in objects that are to be machined may occur, a configuration with which the shift amount can be simply changed is preferable.

For this, in this configuration, the index plate 63A has a plurality of plate sections that have different thicknesses, and the plate sections are disposed on the same circumference such that the shift amount is variable.

Figure 6:
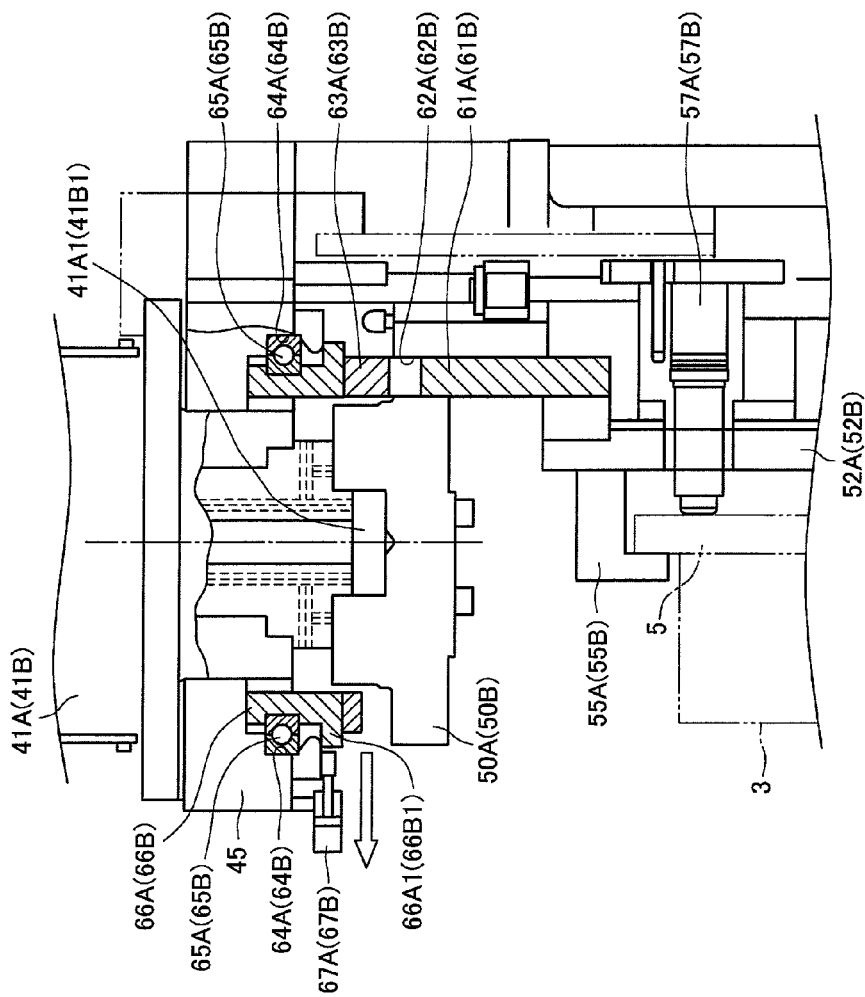
FIG. 6 is a side cross-sectional view of the surroundings of the index plate.

Specifically, as shown in FIG. 6, a circular recess 64A is formed in the lower surface of the upper frame member 45, which forms the device body 40, such that the circular recess 64A surrounds the rotary shaft 41A1 of the drive motor 41A. A stopper support plate 66A having an annular shape is rotatably attached to the inner surface of the recess 64A with a bearing 65A interposed therebetween, and the index plate 63A is attached to the lower surface of the stopper support plate 66A.

In addition, a larger diameter section 66A1 having a larger diameter is provided on the lower end of the stopper support plate 66A, and a lock cylinder 67A is provided, at a height position of the larger diameter section 66A1. The lock cylinder 67A is fixed to the upper frame member 45, and regulates the rotation of the stopper support plate 66A and the index plate 63 by fixing the stopper support plate 66A by stretching toward the larger diameter section 66A1 of the stopper support plate 66A.

Figure 7A:
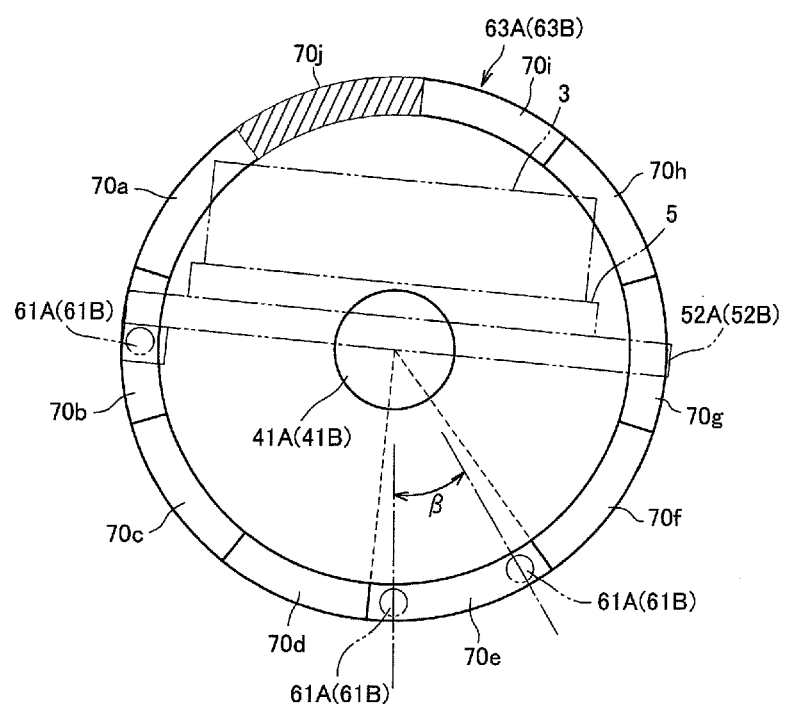
FIG. 7A is a view showing the relationship between the index plate and the shift table.
Figure 7B:
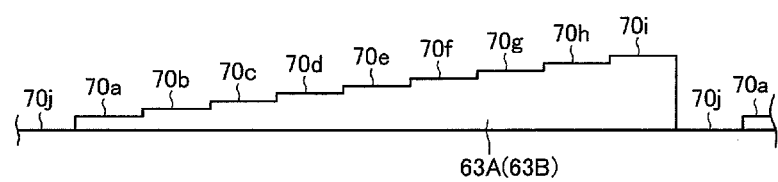
FIG. 7B is a development view showing changes in the thickness of the index plate.

As shown in FIG. 7A and FIG. 7B, the index plate 63A is provided with a plurality of plate sections 70a to 70j (10 plate sections in an exemplary embodiment) having different thicknesses (i.e. widths in the direction of the rotary shaft 41A1), in which the plate sections 70a to 70j are disposed on the same circumference. One plate section is formed on a horizontal plane having the same height, and the respective plate sections are formed in a step-like fashion.

In an exemplary embodiment, the plate section 70j is a hollow plate section, and is formed as a penetrating section that penetrates in the thickness direction. In this configuration, even though the shift table 52A is moved upward to the highest point, when the positioning shaft 61A intersects the index plate 63A at a portion of the penetrating section 70j, the positioning shaft 61A does not come into contact with the index plate 63A in the axial direction (thickness direction). In addition, in this case, the upper end of the positioning shaft 61A extends upward further than the contact surface of the adjacent plate section 70a such as to engage with the wall surfaces of the plate section 70a and the plate section 70i (wall surfaces positioned on both ends in the circumferential direction of the penetrating section 70j).

Because of this, when the drive motor 41A is operated in the state in which the upper end of the positioning shaft 61A is engaged with the wall surface of the plate section 70a or the plate section 70i and the lock cylinder 67A is released, the index plate 63A rotates by being pulled by the positioning shaft 61A. Consequently, due to the plate section being set to a desired height position, it becomes possible to easily change the shift amount and the machining can become easy.

In addition, in this configuration, a plurality of plate sections 70a to 70j having different thicknesses are disposed on the same circumference. Consequently, the adjustment of the amount of rotation of the index plate 63A makes it possible to adjust the region with which the positioning shaft 61A comes into contact, as required, in the range of an angle β. Due to this, even in the case of a cylinder head which machines a workpiece with the same shift amount, the angle at which the valve hole is to be machined can be easily adjusted. Therefore, it is possible to easily cope with a minor change or the like.

In addition, although not shown, the surroundings of the index plate 63A are configured such that the rotational position of the index plate 63A can be determined by detecting the thickness of that plate section. In the meantime, since the configuration of the surroundings of the drive motor 41B is the same as that of the surroundings of the drive motor 41A, the same reference numerals are used and a description thereof will be omitted.

In sequence, the operation of adjusting the shift amount will be described.

Figure 8:
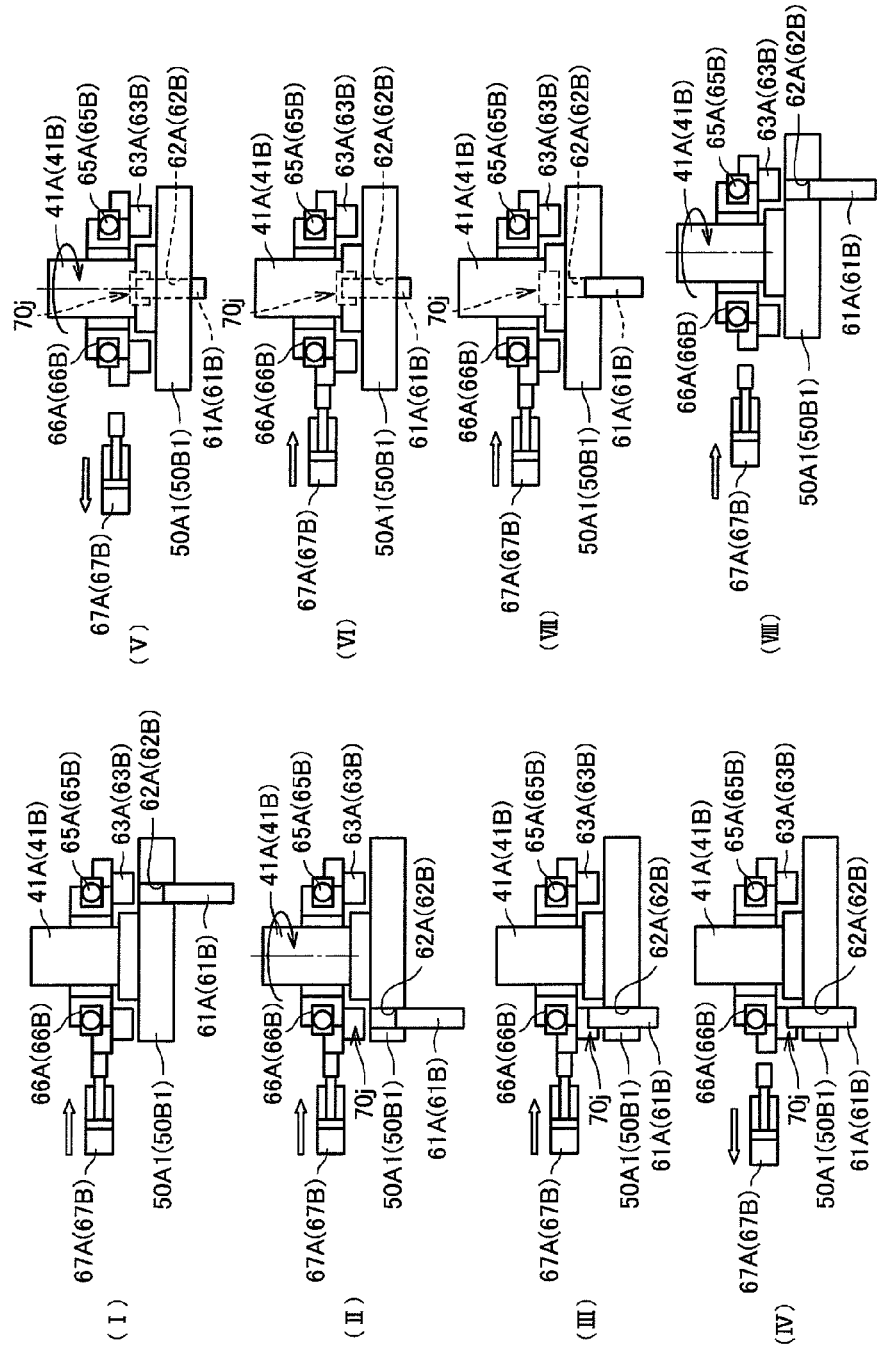
FIG. 8 is a view showing an operation of adjusting a shift amount.

First, as shown in part (I) of FIG. 8, in the state in which the jig body (upper member 50A1) is in a predetermined position, the leading end of the lock cylinder 67A is brought into contact with the side surface of the larger diameter section 66A1 of the stopper support plate 66A by stretching the lock cylinder 67A, thereby preventing the stopper support plate 66A and the index plate 63A from rotating. Here, the predetermined position refers to a position (angle) in which the direction in which a valve hole formed in the cylinder block is machined is identical with the direction in which a tool of the multi-spindle head 24 extends.

In sequence, the jig body 15A is rotated, so that the positioning shaft 61A is positioned below the blank plate section 70j, as shown in part (II) of FIG. 8. In addition, as shown in part (III) of FIG. 8, the hydraulic cylinder 59A is operated, thereby moving the shift table 52A upward.

In this case, since the blank plate section 70j is positioned above the positioning shaft 61A, the positioning shaft 61A does not come into contact with the index plate 63A even though the shift table 52A is moved upward to the highest point.

In sequence, as shown in part (IV) of FIG. 8, the stopper support plate 66A and the index plate 63A are released from the fixed state by shrinking the lock cylinder 67A. In addition, as shown in part (V) of FIG. 8, the drive motor 41A is operated so that the index plate 63A rotates together with the jig body 15A. In this case, the index plate 63A is rotated until the plate section having a predetermined thickness is moved above the positioning shaft 61A in the predetermined position.

In sequence, as shown in part (VI) of FIG. 8, the stopper support plate 66A and the index plate 63A are fixed by stretching the lock cylinder 67A. In addition, as shown in part (VII) of FIG. 8, the hydraulic cylinder 59A is operated so that the shift table 52A is moved downward, thereby releasing the engagement between the positioning shaft 61A and the index plate 63A.

Finally, as shown in part (VIII) of FIG. 8, the shift amount at the predetermined position is adjusted to a desired value in response to the jig body 15A being rotated to the predetermined position.

As such, in this configuration, since the index plate 63A is configured such as to be rotatable and this index plate 63A is also provided with the blank plate section 70j, which engages with the lock cylinder 67A, it is possible to rotate the index plate 63A using the drive motor 41A, which rotates the jig body 15A. It is therefore possible to simplify the configuration of the apparatus.

As described above, according to an exemplary embodiment, the two cylinder heads 3 and 3 are arranged side by side. The intake valve holes 34a, 34c, 34e and 34g in the respective upper portions of the cylinders 31a to 31d in one cylinder head 3 and the exhaust valve holes 35a, 35c, 35e and 35g in the respective upper portions of the cylinders 31a to 31d in the other cylinder head 3 are machined simultaneously using the multi-spindle head 24, in which the intake-side tools 26a to 26d and the exhaust-side tools 28a to 28d are integrally provided. Then, one cylinder head 3 is moved upward to the pitch P1 of the intake valve holes, and the other cylinder head 3 is moved upward to the pitch P2 of the exhaust valve holes. In this way, the remaining intake valve holes 34b, 34d, 34f and 34h in one cylinder head 3 and the remaining exhaust valve holes 35b, 35d, 35f and 35h of the other cylinder head 3 are machined simultaneously using the multi-spindle head 24. Consequently, the operations of machining the intake valve holes 34a to 34h of one cylinder head 3 and machining the exhaust valve holes 35a to 35h of the other cylinder head 3 can be realized by the two cutting processes. It is therefore possible to reduce the number of the steps of the machining process, thereby decreasing the working time.

In addition, according to an exemplary embodiment, it is possible to machine the respective valve holes in the cylinder head 3 with a simple configuration without preparing a plurality of multi-spindle tools that are set to the pitches of the valve holes. In addition, since the cylinder heads 3 and 3 are moved up and down with respect to the multi-spindle head 24, it is possible to reduce the frequency of moving the heavy multi-spindle head 24, thereby simplifying the machining process of the valve holes.

In addition, according to an exemplary embodiment, it is possible to continuously machine the exhaust valve holes 35a to 35h and the intake valve holes 34a to 34h in one cylinder head 3, in which the exhaust valve holes 35a to 35h are formed, by moving the cylinder head 3 toward the intake-side tools 26a to 26d. Thus, the machining process can be easily performed.

In addition, according to an exemplary embodiment, provided are the shift tables 52A and 52B, which fix the two cylinder heads 3 and 3, which are provided together. The multi-spindle head 24 is disposed such as to face the shift tables 52A and 52B, and is integrally provided with the intake-side tools 26a to 26d, which machine part of the intake valve holes 34a to 34h of one cylinder head 3, and the exhaust-side tools 28a to 28d, which machine part of the intake valve holes 35a to 35h of the other cylinder head 3. Also provided are the hydraulic cylinders 59A and 59B, which separately move the respective cylinder heads 3 and 3 by lengths corresponding to the pitches P1 and P2 of the respective valve holes with respect to the multi-spindle head 24. Consequently, it is possible to realize the operations of machining the intake valve holes 34a to 34h of one cylinder head 3 and machining the exhaust valve holes 35a to 35h of the other cylinder head 3 by the two cutting processes. It is therefore possible to reduce the number of the steps of the machining process, thereby realizing a decrease in the working time.

In addition, according to an exemplary embodiment, as the clamp device that is used in machining valve holes in the cylinder heads 3, provided are the shift tables 52A and 52B, which can rotate around the rotary shafts 41A1 and 41A2, the drive motors 41A and 41B, which adjust the positions at which the shift tables 52A and 52B rotate, the pallet clamp cylinders 55A, 55B, 56A and 56B and the positioning cylinders 57A, 57B, 58A and 58B, which are provided on the shift tables 52A and 52B such as to clamp the respective pallets 5 on which the respective cylinder heads 3 are loaded, the positioning shafts 61A and 61B, which are fixed to the upper ends of the shift tables 52A and 52B, the hydraulic cylinders 59A and 59B, which press the shift tables 52A and 52B upward, and the index plates 63A and 63B with which the positioning shafts 61A and 61B come into contact when the shift tables 52A and 52B are pressed upward. Consequently, it is possible to simply move the cylinder heads 3 up and down by operating the hydraulic cylinders 59A and 59B until the cylinder heads 3 come into contact with the index plates 63A and 63B. In addition, since each of the index plates 63A and 63B has a plurality of plate sections 70a to 70j having different thicknesses, which are disposed on the same circle, it is possible to change the thickness of the plate section with which each of the positioning shafts 61A and 61B comes into contact by rotating each of the index plates 63A and 63B. Therefore, it is possible to change the amount by which the cylinder head 3 is moved up and down with a simple configuration.

In addition, according to an exemplary embodiment, the index plates 63A and 63B are provided with the blank plate sections 70j, which engage with the index plates 63A and 63B without coming into contact with the index plates 63A and 63B when the shift tables 52A and 52B are moved upward to the highest point. In the state in which the positioning shafts 61A and 61B are engaged with the plate sections 70j, the index plates 63A and 63B rotate together with the shift tables 52A and 52B in response to the rotation of the drive motors 41A and 41B.

Consequently, it is possible to rotate the index plates 63A and 63B using the drive motors 41A and 41B, which adjust the positions at which the shift tables 52A and 52B rotate. In this way, the configuration of the apparatus is simplified. It is therefore possible to change the amount by which the cylinder heads 3 as a workpiece are moved up and down using the simple configuration.

In the meantime, the present invention is not limited to the above-described exemplary embodiments but can employ a variety of configurations without departing from the concept of the invention.

According to an embodiment of the invention, a plurality of valve holes 34 and 35 in one cylinder head 3 of the combustion engine may be machined using the first tool 26 and the second tool 28. Here, the valve holes 34 and 35 may be machined by the process of machining one valve hole 34 of a pair of the first valve holes 34 using the first tool 26, moving the cylinder head 3 with respect to the first tool 26, and then the other valve hole 34 of a pair of the first valve holes 34 using the first tool 26, and the process of machining one valve hole 35 of a pair of the second valve holes 35 using the second tool 28, moving the cylinder head 3 with respect to the second tool 28, and then machining the other valve hole 35 of a pair of the second valve holes 35.

According to this configuration, it is possible to machine the valve holes in the cylinder head with a simple configuration without preparing a plurality of multi-spindle tools that are set to the pitch of the valve holes. In addition, since the cylinder head is moved with respect to the multi-spindle tool, it is possible to reduce the frequency of moving the heavy multi-spindle tool, thereby simplifying the machining process of the valve holes.

In the above-described configuration, the machining process may include disposing a pair of the cylinder heads 3 side by side, machining one of the first valve holes 34 of one cylinder head 3 and one of the second valve holes 35 of the other cylinder head 3 using the unitary multi-spindle tool 22, which is integrally provided with the first tool 26 and the second tool 28, moving the respective cylinder heads 3 with respect to the unitary multi-spindle tool 22 as much as the pitch P1 between a pair of the first valve holes 34 or the pitch P2 between a pair of the second valve holes 35, and then machining the other of the first valve holes 34 of the other cylinder head 3 and the other of the second valve holes 35 of the other cylinder head 3.

According to this configuration, the operations of machining the intake valve holes of one cylinder head and machining the exhaust valve holes of the other cylinder head can be realized by the two cutting processes. It is therefore possible to reduce the number of the steps of the machining process, thereby decreasing the working time According to the above-described configuration, the cylinder head 3 in which one of a pair of the first vale holes 34 and one of a pair of the second valve holes 35 is formed may be moved toward the tools 26 and 26, which machine the other of a pair of the first valve holes 34 and a pair of the second valve holes 35.

According to this configuration, it is possible to continuously machine the exhaust valve holes and the intake valve holes in one cylinder head, thereby facilitating the machining process.

In addition, according to an embodiment of the invention, the apparatus for machining valve holes 1, which machines a plurality of the intake valve holes and a plurality of the exhaust valve holes in the cylinder heads of the internal combustion engine, may be provided with two bodies 15A and 15B to which the two cylinder heads 3 and 3 are fixed, the multi-spindle tool 22, which is disposed such as to face the bodies 15A and 15B and is provided with the first tool 26, which machines the intake valve holes 34 of one cylinder head 3, and the second tool 28, which machines the exhaust valve holes 35 of the other cylinder head 3, and the moving devices 59A and 59B, which move the respective cylinder heads 3 with respect to the multi-spindle tool 22.

According to this structure, the operations of machining the intake valve holes of one cylinder head and machining the exhaust valve holes of the other cylinder head can be realized by the two cutting processes. It is therefore possible to reduce the number of the steps of the machining process, thereby decreasing the working time.

According to an embodiment of the invention, the clamp device 9 may include the body sections 52A and 52B, which can rotate around the rotary shafts 41A1 and 41B1, rotary units 41A and 41B, which adjust the positions at which the bodies 52A and 52B are rotated, stopper sections 61A and 61B, each of which is fixed to one axial end of each of the bodies 52A and 52B, urging devices 59A and 59B, which urge the body sections 52A and 52B to one side of the axial direction, and the index plates 63A and 63B with which the stopper sections 61A and 61B come into contact when the body sections 52A and 52B are pressed to one side of the axial direction. The index plates 63A and 63B may have a plurality of the plate sections 70a to 70j having different thicknesses, which may be disposed on the same circumference.

Since this structure is provided with the stopper section, which is fixed to one end of the workpiece-holding body section in the axial direction, the urging device, which urges the body section to one side of the axial direction, and the index plate with which the stopper section comes into contact when the body section is urged to one side of the axial direction, it is possible to simply shift a workpiece by operating the urging device until the stopper section comes into contact with index plate. In addition, the index plate has a plurality of plates having different thicknesses, which are disposed on the same circumference. It is possible to change the thickness of the plate section with which the stopper section comes into contact by rotating the index plate, thereby changing the shift amount of the workpiece with a simple configuration.

In the above-described structure, the index plates 63A and 63B may be provided with the penetrating section 70*j*, which is configured such as not to come into axial contact with the stopper sections 61A and 61B when the body sections 52A and 52B are moved by the maximum amount to one side of the axial direction. It may be configured such that, in the state in which the stopper sections 61A and 61B are engaged with the wall surface, which is positioned at the end of the penetrating section 70*j* in the circumferential direction, the index plates 63A and 63B rotate together with the body sections 52A and 52B in response to the rotation of the rotary units 41A and 41B.

According to this structure, it is possible to rotate the index plate using the drive unit, which adjusts the position at which the body section rotates, such that the configuration of the apparatus is simplified. It is therefore possible to change the shift amount of a workpiece using the simple configuration.

DESCRIPTION OF REFERENCE NUMERAL

1 . . . Valve holes machining apparatus
3. . . Cylinder head (Workpiece)
5. . . Pallet
7. . . Conveyor
9. . . Clamp device
13. . . Machine tool
15A, 15B . . . Jig body
22. . . Multi-spindle tool
24. . . Multi-spindle head (Integrated multi-spindle head)
26*a* to 26*d* . . . Intake side tool (Multi-spindle tool for intake side valve holes)
27*a* to 27*d* . . . Intake side tool holder (Multi-spindle tool for intake side valve holes)
28*a* to 28*d* . . . Exhaust side tool (Multi-spindle tool for exhaust side valve holes)
29*a* to 29*d* . . . Exhaust side tool holder (Multi-spindle tool for exhaust side valve holes)
34*a* to 34*h* . . . Intake valve hole
35*a* to 35*h* . . . Exhaust valve hole
40 . . . Device body
41A, 41B . . . Drive motor (Rotary unit)
51A . . . Frame section
52A, 52B . . . Shift table (Body section)
55A, 55B . . . Pallet clamp cylinder (Clamping section)
56A, 56B . . . Pallet clamp cylinder (Clamping section)
57A, 57B . . . Positioning cylinder (Clamping section)
58A, 58B . . . Positioning cylinder (Clamping section)
59A . . . Hydraulic cylinder (Urging device, Moving device)
61A, 61B . . . Positioning shaft (Stopper section)
63A, 63B . . . Index plate
70*a* to 70*j* . . . Plate section
P1 to P3 . . . Pitch The invention claimed:

1. A valve hole machining method of machining a plurality of valve holes in a pair of cylinder heads for an internal combustion engine, the plurality of valve holes including a pair of first valve holes and a pair of second valve holes in each of a plurality of cylinders of the pair of cylinder heads, a first pitch between the pair of first valve holes is different from a second pitch between the pair of second valve holes, the method comprising:
   disposing each of the pair of cylinder heads to each of a pair of shift tables so that the plurality of cylinders are disposed in a vertical direction;
   using a unitary multi-spindle tool in which a first tool disposed at a third pitch in the vertical direction and a second tool disposed at the third pitch in the vertical direction are integrally provided;
   machining one of the first valve holes in one of the cylinder heads by the first tool and one of the second valve holes in the other of the cylinder heads by the second tool;
   moving upward the one of the shift tables with respect to the unitary multi-spindle tool by the first pitch between the pair of first valve holes and moving upward the other of the shift tables with respect to the unitary multi-spindle tool by the second pitch between the pair of second valve holes;
   machining the other of the first valve holes in the one of the cylinder heads by the first tool and the other of the second valve holes in the other of the cylinder heads by the second tool;
   discharging the other of the cylinder heads disposed in the other of the shift tables;
   moving the one of the cylinder heads disposed in the one of the shift tables to the other of the shift tables;
   disposing another cylinder head to the one of the shift tables; and
   repeating the machining.

* * * * *